(12) United States Patent
Gotterbarm et al.

(10) Patent No.: US 10,024,607 B2
(45) Date of Patent: Jul. 17, 2018

(54) HEAT EXCHANGER TUBE AND METHODS FOR PRODUCING A HEAT EXCHANGER TUBE

(71) Applicant: WIELAND-WERKE AG, Ulm (DE)

(72) Inventors: Achim Gotterbarm, Dornstadt-Boettingen (DE); Ronald Lutz, Blaubeuren (DE); Andreas Beutler, Weissenhorn (DE)

(73) Assignee: WIELAND-WERKE AG, Ulm (DE)

( * ) Notice: Subject to any disclaimer, the term of this patent is extended or adjusted under 35 U.S.C. 154(b) by 357 days.

(21) Appl. No.: 14/849,101

(22) Filed: Sep. 9, 2015

(65) Prior Publication Data

US 2015/0375349 A1    Dec. 31, 2015

Related U.S. Application Data

(62) Division of application No. 12/928,294, filed on Dec. 8, 2010, now Pat. No. 9,234,709.

(30) Foreign Application Priority Data

Dec. 22, 2009 (DE) .......................... 10 2009 060 395

(51) Int. Cl.
*F28F 1/40* (2006.01)
*B21C 37/20* (2006.01)
(Continued)

(52) U.S. Cl.
CPC .............. *F28F 1/40* (2013.01); *B21C 37/207* (2013.01); *B21H 7/187* (2013.01); *B23P 15/26* (2013.01);
(Continued)

(58) Field of Classification Search
CPC ... F28F 1/40; F28F 13/187; F28F 1/42; B23P 15/26; B21H 7/187; B21C 37/207
See application file for complete search history.

(56) References Cited

U.S. PATENT DOCUMENTS 3,684,007 A    8/1972 Ragi
5,803,165 A    9/1998 Shikazono et al.
(Continued)

FOREIGN PATENT DOCUMENTS

CN    101556124 A    10/2009
CN    101556125 A    10/2009
(Continued)

OTHER PUBLICATIONS

Notice of Rejection of Japan Patent Office issued in Application No. 2010-270010 with English translation (22 pages).
(Continued)

*Primary Examiner* — Moshe Wilensky
(74) *Attorney, Agent, or Firm* — Flynn, Thiel, Boutell & Tanis, P.C.

(57) ABSTRACT

A heat exchanger tube with a tube axis, a tube wall, a tube outside and a tube inside. Continuously running, axially parallel or helically circling inner ribs are formed out of the tube wall on the tube inside, each inner rib having two rib flanks and a rib tip. A continuously extending groove is formed between adjacent inner ribs. The rib tip has at regular intervals recurring elevations which have an essentially frustopyramidal form. The inner ribs are raised in the radial direction on the contour line which is defined by the transitional edge of a rib flank to the rib tip and protuberances advancing out of the rib flank are formed in this region. Furthermore, the invention relates to a method for producing a heat exchanger tube.

4 Claims, 4 Drawing Sheets

(51) Int. Cl.
*B21H 7/18* (2006.01)
*B23P 15/26* (2006.01)
*F28F 1/42* (2006.01)
*F28F 13/18* (2006.01)

(52) U.S. Cl.
CPC ............... *F28F 1/42* (2013.01); *F28F 13/187* (2013.01); *Y10T 29/49391* (2015.01)

(56) References Cited

U.S. PATENT DOCUMENTS

| | | | |
|---|---|---|---|
| 5,992,513 | A | 11/1999 | Suzuki et al. |
| 6,018,963 | A | 2/2000 | Itoh et al. |
| 6,056,048 | A | 5/2000 | Takahashi et al. |
| 6,176,302 | B1 | 1/2001 | Takahashi et al. |
| 6,412,549 | B1 | 7/2002 | Itoh et al. |
| 6,883,597 | B2 | 4/2005 | Thors et al. |
| 7,267,166 | B2 | 9/2007 | Leterrible et al. |
| 2003/0094272 | A1 | 5/2003 | Brand et al. |
| 2005/0241150 | A1 | 11/2005 | Brand et al. |

FOREIGN PATENT DOCUMENTS

| | | |
|---|---|---|
| DE | 10 2009 007 446 A1 | 8/2010 |
| EP | 1 312 885 B1 | 5/2003 |
| EP | 1 312 885 B1 | 10/2005 |
| JP | 58-83189 A | 5/1983 |
| JP | 10-197184 A | 7/1998 |
| JP | 11-285764 A | 10/1999 |
| JP | 2009-58186 A | 3/2009 |

OTHER PUBLICATIONS

Search Report of European Patent Office issued in Application No. 10015451 with English translation, together with English translation of category of cited documents dated Jun. 5, 2014 (13 pages).
German Office Action for corresponding application DE 10 2009 060 395.6, dated Oct. 8, 2015 (6 pages).

HEAT EXCHANGER TUBE AND METHODS FOR PRODUCING A HEAT EXCHANGER TUBE

This is a divisional of prior U.S. application Ser. No. 12/928,294, filed Dec. 8, 2010.

The invention relates to a heat exchanger tube and to methods for producing a heat exchanger tube.

Heat transmission occurs in many sectors of refrigerating and air conditioning technology and also in process and power engineering. Heat exchangers with tubes are often used for heat transmission in these fields. In many applications, in this case, a liquid or gaseous medium flows on the tube inside and is cooled or heated as a function of the direction of the heat flow. The heat is dispensed to the medium located on the tube outside or is extracted from this.

In order to allow heat transport between the heat-dispensing medium and the heat-absorbing medium, the temperature of the heat-dispensing medium must be higher than the temperature of the heat-absorbing medium. This contrast in temperature is designated as the driving temperature difference. The higher the driving temperature difference is, the more heat can be transmitted. On the other hand, the aim is often to keep the driving temperature difference low, since this has benefits for the efficiency of the process.

It is known that heat transmission can be intensified by means of the structuring of the heat transmission surface. What can be achieved thereby is that more heat can be transmitted per unit of heat transmission surface than in the case of a smooth surface. Furthermore, it is possible to reduce the driving temperature difference and consequently make the process more efficient. In metallic heat exchanger tubes, the structuring of the heat transmission surface is often obtained by the forming of ribs or similar elements out of the material in the tube wall. These integrally formed ribs have a firm metallic bond with the tube wall and can therefore transmit heat optimally.

An embodiment of heat exchangers which is often used is a tube bundle heat exchanger. These appliances frequently make use of tubes which are structured both on their inside and on their outside. Structured heat exchanger tubes for tube bundle heat exchangers usually possess at least one structured region and also smooth end pieces and, if appropriate, smooth intermediate pieces. The smooth end pieces or intermediate pieces delimit the structured regions. So that the tube can easily be built into the tube bundle heat exchanger, the outside diameter of the structured regions should not be greater than the outside diameter of the smooth end pieces and intermediate pieces.

Axially parallel or helical ribs are often used on the inside of tubes in order to improve the heat transmission properties. The ribbing increases the size of the inner surface of the tube. Furthermore, in the case of helically arranged ribs, the turbulence of the medium flowing in the tube is increased, and therefore heat transmission is improved. It is known that the heat transmission properties of axially parallel or helical ribbing on the tube inside can be improved by providing the inner ribs with notches or grooves. Examples of this are to be found in EP 1312885 B1, CN 101556124 A, CN 101556125 A, U.S. Pat. No. 5,992,513, U.S. Pat. No. 6,018,963 and U.S. Pat. No. 6,412,549. The notching of the ribs gives rise to a structure with an alternating rib height and with lateral material projections on the rib flank. This structure additionally increases the turbulence of the medium flowing in the tube.

Particularly in refrigerating and air conditioning technology applications, the efficiency of refrigerating plants in a part-load situation is assuming increasing importance. In a part-load situation, the throughflow quantity of the heat transfer medium is often reduced, and therefore the velocity of the medium flowing in the tube decreases markedly. Since the main fraction of the heat transition resistance is then shifted onto the tube inside, it is necessary further to improve the now known structures on the tube inside, particularly with regard to low flow velocities.

The object on which the invention is based is to develop a heat exchanger tube in terms of the heat transmission properties and also to specify a method for producing a heat exchanger tube of this type.

The invention is reproduced, with regard to a heat exchanger tube. Furthermore, the invention is reproduced, with regard to a method for producing the heat exchanger tube and advantageous refinements and developments of the invention.

The invention includes a heat exchanger tube with a tube axis, with a tube wall, with a tube outside and with a tube inside. Continuously running, axially parallel or helically circling inner ribs are formed out of the tube wall on the tube inside, each inner rib having two rib flanks and a rib tip. A continuously extending groove is formed in each case between adjacent inner ribs. The rib tip has at regular intervals recurring elevations which have an essentially frustopyramidal form. In the solution according to the invention, the rib flanks of the inner ribs are raised in the radial direction at the contour line which is defined by the transitional edge of a rib flank to the rib tip, in that protuberances advancing out of the rib flank are formed in this region.

The invention is in this case based on the consideration that, in order to improve the heat transfer on the tube inside, the turbulence of the medium flowing in the tube is increased and the laminar boundary layer formed in the medium in the near-wall region is disrupted. This purpose is served by specially formed structural elements on the inner surface of the tube, such as, for example, axially parallel or helically circling inner ribs which are provided with additional features. Such a feature is elevations on the rib tip which have an essentially frustopyramidal form. Frustopyramidal elevations on the rib tip are also to be understood as meaning, for example, all forms elongated in one direction of space, for example a bar form. The surface areas of a pyramid frustum may in this case also be designed as curved side and cover faces. The elevations recur at regular intervals in the direction of the rib course. The inner ribs have their maximum rib height in the region of the elevations. The region of the rib tip between two elevations constitutes a relative depression. The inner ribs have their minimum rib height there. The rib height is in each case measured from the tube wall. The transition from an elevation to the adjacent depression takes place by means of the inclined flank of the frustopyramidal elevation. The side faces of a frustopyramidal elevation which run parallel to the rib flank form a seamless transition with the rib flank.

With a decrease in flow velocity of the medium, the laminar boundary layer becomes thicker. When the thickness of the laminar boundary layer is approximately as great as the maximum rib height, the turbulence-increasing action of the inner structure is then markedly diminished. It was shown that this undesirable effect can be prevented if the inner ribs are provided with protuberances at the rib tip. The protuberances run at the transitional edge of a rib flank to the rib tip, in that the transitional region is raised to a greater or lesser extent in the radial direction there. The rib tip thereby acquires a pronounced fine structure emanating from the rib flank. In other words, in a typical appearance of the protuberances, many side faces of the frustopyramidal elevations form ear-like shapes in the radial direction which slightly distort the conventional geometric form of a pyramid frustum. In a preferred form, the protuberances according to the invention are especially pronounced on the inclined pyramid flanks of the elevations, while they are less pronounced on the cover face of the elevations and in the regions between two elevations.

If, by contrast, structures are produced according to the instructions of the prior art from publication U.S. Pat. No. 5,992,513, in that an initially predetermined inner rib is provided with notches, then lateral material projections on the flanks of the inner ribs are obtained in the region of the notches. Depending on the notching depth, these material projections are formed at different heights on the rib flank. However, their distance from the tube wall is always lower than the maximum height of the rib. These lateral material projections cause additional turbulences in the flow as long as the laminar boundary layer is thinner than their distance from the tube wall. With a decrease in flow velocity and an increase in viscosity of the medium, the laminar boundary layer becomes thicker and the action of the lateral material projections is markedly diminished. In these instances, even regions in which the flow and therefore heat transmission virtually come to a standstill may be formed between the material projections and the tube wall.

The special advantage of the solution according to the invention is that the fine structure of the protuberances generates additional vortices in the region of the rib tip and therefore increases the turbulence of the medium flowing in the tube. The increase in performance resulting from this comes to light particularly at low flow velocities, since the protuberances prevent the laminar boundary layer from being formed. Consequently, as a result of the protuberances, heat transmission is intensified to a greater extent than in the structures known from the prior art which do not have these protuberances in the radial direction.

In a preferred refinement of the invention, at least one of the flanks of a frustopyramidal elevation may be of concave design. These side faces then have a curvature which is directed into the pyramid interior and, as a result of which, edge structures which project markedly on the surface area of the pyramid frustum or are sharper are formed. Sharp-edged structures of this type counteract the formation of a laminar flow and are additionally conducive to the formation of vortices in order to increase the heat transmission properties.

Advantageously, the frustopyramidal elevations may be formed asymmetrically. Thus, the asymmetry can be appropriately adapted to the flow conditions inside the tube in order to optimize the heat transmission properties further. For example, the pyramid edges which counteract the laminar flow the most may be of correspondingly sharp-edged form.

In an advantageous embodiment of the invention, the frustopyramidal elevations may project above the depression, lying between two elevations, by 20% to 100% of the height of the inner ribs at the location of the depression.

If the elevations project above the depressions by less than 20% of the minimum inner rib height, then the radial protuberances are pronounced to too little an extent to enable them to influence the flow significantly. Elevations which project above the depressions by more than 100% of the minimum inner rib height are difficult to produce. They would result in undesirable loads on the tools, thus leading to an adverse shortening of the service life. In tubes with an inside diameter of between 10 mm and 25 mm, the minimum height of the inner ribs is preferably 0.20 mm to 0.45 mm, and the maximum height of the inner ribs is preferably more than 0.35 mm to 0.60 mm. The elevations of the rib tip then typically project above the depressions lying between two elevations by 0.05 mm to 0.20 mm.

Preferably, the flank angle of the elevations amounts to at most 120°. The flank angle is the angle which the inclined flanks of the frustopyramidal elevations form on the rib tip. If the angle is greater than 120°, the elevations on the rib tip then form a wave-like structure which does not sufficiently influence the flow of the medium.

In an advantageous refinement, an outer structure may be formed on the tube outside. Thus, the heat exchanger tube according to the invention possesses on its outside a structuring which intensifies heat transmission on the tube outside. Advantageously, the outer structure may be designed in the form of integral, spirally circling outer ribs. Those rib types are designated as being integral which are worked out of the tube wall by means of a forming process. The outer face of the tube is enlarged considerably by the outer ribs, and heat transmission is thereby intensified.

A further aspect of the invention includes a first method for producing a heat exchanger tube according to the invention, in which the following method steps are carried out:

a. the wall of a smooth tube is deformed radially in a first forming region by a first spinning tool circling on the outside of the smooth tube, b. the tube wall is supported in the first forming region by a first rolling mandrel which lies in the tube and which is mounted rotatably and has axially parallel or helical grooves of a first depth on its mandrel outer face, an inner structure being formed in that material of the tube wall is pressed into the grooves of the first rolling mandrel, c. the wall of the smooth tube is deformed radially in a second forming region by a second spinning tool circling on the outside of the smooth tube, d. the tube wall is supported in the second forming region by a second rolling mandrel which lies in the tube and which is likewise mounted rotatably and has axially parallel or helical grooves of a second depth on its mandrel outer face, axially parallel or helical, continuously running inner ribs being newly formed, in that material of the tube wall and material of the inner structure formed in that first forming region are pressed into the grooves of the second rolling mandrel, the inner ribs formed in the second forming region being markedly more pronounced than the inner structure which was formed in the first forming region, and the elevations on the tip of these inner ribs being formed from material which was pressed into the grooves of the first rolling mandrel in the first forming region, and the axial transport of the tube through the forming regions is ensured by a drawing device.

In the first method, the invention proceeds from the consideration that, in order to produce a heat exchanger tube according to the invention, a device is used which consists of at least two spinning tools which are spaced apart from one another and are arranged on the outside of the tube. The spinning tools consist of a plurality of balls or rollers which are positioned annularly and mounted rotatably in a receptacle. The receptacles with the balls or rollers are accommodated in a fixed device and can be rotated about the tube, while the balls or rollers can deform the tube wall in the radial direction. Furthermore, a separate drawing device is present, by means of which the tube can be drawn through the spinning tools in the axial direction.

In order to machine the tube, the spinning tools are rotated about the tube and the tube is drawn in the axial direction by the drawing device. The tube wall is supported in the operating range of the spinning tools by the profiled rolling mandrels. A further aspect of the invention includes a second method for producing a heat exchanger tube according to the invention, in which the following method steps are carried out:

a. helically running outer ribs are formed on the outside of a smooth tube in a first forming region, in that the rib material is obtained as a result of the displacement of material out of the tube wall by means of a first rolling step, and the ribbed tube obtained is set in rotation by the rolling forces and pushed forward correspondingly to the helical outer ribs obtained, the outer ribs being shaped with rising height out of the otherwise non-deformed smooth tube, b. the tube wall is supported in the first forming region by a first rolling mandrel which lies in the tube and which is mounted rotatably and has axially parallel or helical grooves of the first depth on its mandrel outer face, an inner structure being formed in that material of the tube wall is pressed into the grooves of the first rolling mandrel, c. in a second rolling step, the outer ribs are formed with further-rising height in a second forming region spaced apart from the first forming region, d. the tube wall is supported in the second forming region by a second rolling mandrel which lies in the tube and which is likewise mounted rotatably and has axially parallel or helical grooves of the second depth on its mandrel outer face, axially parallel or helical, continuously running inner ribs being newly formed, in that material of the tube wall and material of the inner structure formed in the first rolling step are pressed into the grooves of the second rolling mandrel, the inner ribs formed in the second forming region being markedly more pronounced than the inner structure which was formed in the first forming region, and the elevations on the tip of these inner ribs being formed from material which was pressed into the grooves of the first rolling mandrel in the first forming region.

In the second method, the invention proceeds from the consideration that, in order to produce a heat exchanger tube according to the invention, a device is used which consists of n=3 or 4 toolholders, into which in each case at least two rolling tools spaced apart from one another are integrated. The axis of each toolholder runs obliquely with respect to the tube axis. The toolholders are in each case arranged, offset at 360°/n, on the circumference of the tube. The toolholders are advanceable radially. They are arranged, in turn, in a fixed roll stand. The rolling tools consist of a plurality of rolling disks which are arranged next to one another and the diameter of which increases in the direction of the progressive degree of forming of the outer ribs.

In order to machine the tube, the rotating rolling tools arranged on the circumference are advanced radially to the smooth tube and brought into engagement with the smooth tube. The smooth tube is thereby set in rotation about its axis. Since the axes of the rolling tools are set obliquely with respect to the tube axis, the rolling tools form helically circling outer ribs out of the wall material of the smooth tube and simultaneously push the ribbed tube obtained forward correspondingly to the pitch of the helically circling outer ribs. The first rolling tools in each toolholder begin to form the outer ribs, and the further rolling tools in each toolholder continue the further forming of the outer ribs. The spacing between two rolling tools must be adapted such that the rolling disks of the following rolling tool engage into the grooves which are between the outer ribs formed by the preceding rolling tool.

The spacing, measured longitudinally with respect to the tube axis, of the centers of two adjacent outer ribs is designated as the rib division p. The rib division usually amounts to between 0.4 and 2.2 mm. The outer ribs circle preferably in the manner of a multiple-flight thread. The tube wall is supported in the operating range for the rolling tools by the profiled rolling mandrels.

Method aspects belonging jointly to the first and the second method are explained in more detail below. Thus, two differently profiled rolling mandrels are likewise an integral part of both devices. These rolling mandrels are attached one behind the other and coaxially to a rod and are mounted rotatably on the latter. The common axis of the rolling mandrels is identical to the axis of the rod and coincides with the tube axis.

In the first method, the rod is fixed by a suitable holding device such that the rolling mandrels are positioned in the operating range of the spinning tools. In the second method, the rod is fastened at its other end to the roll stand itself. The rolling mandrels are positioned in the operating range of the rolling tools by means of the rod. In this case, the rolling mandrel which is first in the direction of the progressive degree of forming is positioned in the operating range of the spinning tool or rolling tool which is first in the direction of the progressive degree of forming, while the rolling mandrel which is second in the direction of the progressive degree of forming is positioned in the operating range of the spinning tools or rolling tools which follow in the direction of the progressive degree of forming. The outside diameter of the second rolling mandrel is somewhat smaller than that of the first rolling mandrel.

The profile of the rolling mandrels usually consists of a plurality of essentially trapezoidal grooves which are arranged parallel to one another on the outer face of the rolling mandrel. The flank angle of the grooves of the first rolling mandrel is designated by $\beta 1$. The grooves of the first rolling mandrel run at an angle of twist of 0° to 60° with respect to the axis of the rolling mandrel and have a first depth. The flank angle of the grooves of the second rolling mandrel is designated by $\beta 2$. The grooves of the second rolling mandrel run at an angle of twist of 0° to 45°, preferably of 25° to 45°, with respect to the axis of the rolling mandrel and have a second depth. The second depth of the grooves of the second rolling mandrel is markedly greater than the first depth of the grooves of the first rolling mandrel. The angles of twist of the rolling mandrels are selected such as to give rise to an intermediate angle of at least 40°. Advantageously, the intermediate angle lies between 70° and 100°. Preferably, the grooves of the first rolling mandrel are twisted contradirectionally to the grooves of the second rolling mandrel in order to implement the desired intermediate angle.

In the first forming region, the material of the tube wall is pressed into the grooves of the first rolling mandrel by the radial forces of the first spinning tool or of the first rolling tool. An inner structure is thereby formed in the shape of axially parallel or helical inner ribs on the inner surface of the tube. The angle of twist, measured with respect to the tube axis, of the inner ribs is identical to the angle of twist of the grooves of the first rolling mandrel. The height H1, measured from the tube wall, of the inner ribs formed in this first forming step preferably amounts to between 0.05 mm and 0.20 mm. This inner structure is thus pronounced to a relatively low extent. The height of the inner ribs formed in the first forming step is approximately as great as, but no greater than, the first depth of the grooves of the first rolling mandrel. It may be expedient to fill the grooves of the first rolling mandrel with material completely. In this case, the height H1 of the inner ribs formed in the first forming step is as great as the first depth of the grooves of the first rolling mandrel.

The outside diameter of the second rolling mandrel must be smaller than the clear inside diameter of the tube after the forming of the first inner ribs. The clear inside diameter of the tube after the forming of the first inner ribs is approximately identical to the outside diameter of the first rolling mandrel, minus double the height of the inner structure formed in the first rolling step.

In the second forming region, the material of the tube wall and of the inner ribs formed in the first forming region is pressed into the grooves of the second rolling mandrel by the radial forces of the further spinning tools or rolling tools. Axially parallel or helical, continuously running inner ribs are thereby newly formed on the inner surface of the tube. The angle of twist, measured with respect to the tube axis, of these newly formed inner ribs is identical to the angle of twist of the grooves of the second rolling mandrel. Since the angles of twist of the rolling mandrels are selected such that they form an angle at least 40°, the material of the inner ribs formed in the first forming step is deformed again at regular intervals predetermined by the profiling of the second rolling mandrel. Part of this deformed material forms the protuberances according to the invention in the radial direction at the tip of the inner ribs formed in the second forming step. The regions, not deformed in the second forming step, of the inner ribs formed in the first rolling step constitute frustopyramidal elevations on the tip of the inner ribs formed in the second rolling step. This production method has the effect that the protuberances according to the invention in the radial direction are especially pronounced at the inclined flanks of the frustopyramidal elevations, whereas they are less pronounced on the tip of the elevations and in the regions between two elevations.

In order to make it possible to carry out the forming, desired in the second forming step, of the new inner ribs out of the material of the tube wall, the second depth of the grooves of the second rolling mandrel must be markedly greater than the height of the inner ribs formed in the first forming step. This makes it possible to enable the inner ribs formed in the second forming step to be more pronounced than the inner structure of the first forming step. The second depth of the grooves of the second rolling mandrel must be at least as great as the desired maximum height of the new inner ribs. Depending on the number and height of the inner ribs, the inner surface of the finished tube may exceed the inner surface of the non-deformed smooth tube by up to 100%.

In a preferred refinement of the invention, by means of the inner structure formed in the first forming region, the inner surface of the tube having this inner structure can be increased by at least 4% and by at most 30% with respect to the inner surface of the non-deformed smooth tube. This inner structure is therefore pronounced to a relatively low extent.

In the further preferred refinement of the invention, the second depth of the grooves of the second rolling mandrel may be at least 2.5 times as great as the first depth of the grooves of the first rolling mandrel. This makes it possible to enable the inner ribs formed in the second rolling step to reach a markedly greater maximum rib height than the height of the inner structure of the first rolling step.

In a preferred refinement of the invention, the flank angle (opening angle) of the grooves of the first rolling mandrel may amount at most to 120°. A preferred configuration of the frustopyramidal elevations for the rib tips can thereby be achieved.

Exemplary embodiments of the invention are explained in more detail by means of the diagrammatic drawings in which.

Parts corresponding to one another are given the same reference symbols in all the figures.

Figure 1:
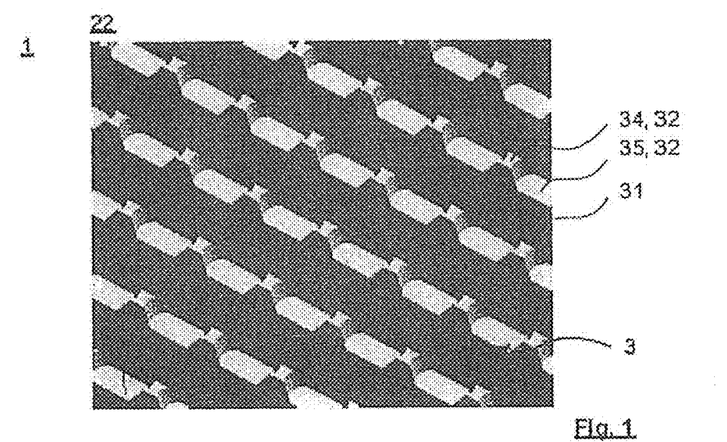
FIG. 1 shows an oblique view, emphasized by shadings, of the tube inner structure with ribs and with frustopyramidal elevations.
Figure 2:
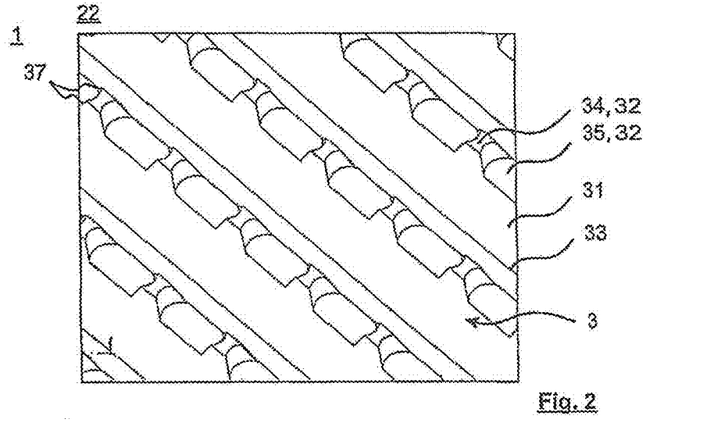
FIG. 2 shows a diagrammatic oblique view of the tube inner structure according to FIG. 1.

FIG. 1 shows an oblique view, emphasized by gray shadings, of the structure of the tube inside 22 of a heat exchanger tube 1 with inner ribs 3 and with frustopyramidal elevations 34. FIG. 2 shows a diagrammatic oblique view of the tube inner structure according to FIG. 1.

Figure 3:
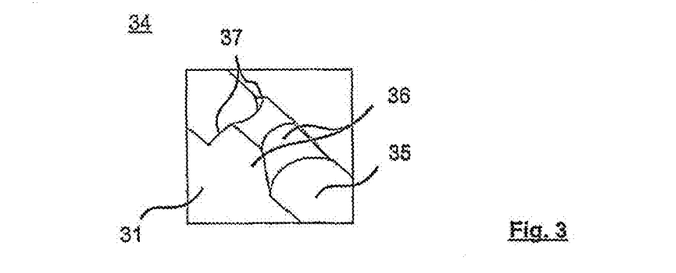
FIG. 3 shows a view, in the form of a detail, of a frustopyramidal elevation at the rib tip.

Continuously running, helically circling inner ribs 3 are formed on the tube inside 22, each inner rib 3 having two rib flanks 31 and a rib tip 32. A continuously extending groove 33 is formed in each case between adjacent inner ribs 3. The rib tip 32 has at regular intervals recurring elevations 34 which have an essentially frustopyramidal form. The rib flanks 31 of the inner ribs 3 are raised on the contour line defined by the transitional edge of a rib flank 31 to the rib tip 32. FIG. 3 shows a view, in the form of a detail, of a frustopyramidal elevation 34 on the rib tip 32, with protuberances 37 in the radial direction which are formed out of the rib flank 31 at the contour line in this region.

In FIG. 3, two flanks 36 of the frustopyramidal elevation 34 illustrated are of concave form. These flanks 36 are also part of the rib tip 32 and have a curvature which is directed into the pyramid interior and by means of which edge structures projecting markedly on the surface area of the pyramid frustum or being sharper are formed in the shape of protuberances 37 in the radial direction. The rib tip 32 is configured in the form of a depression 35 between elevations 34. The sharp-edged structures have a beneficial effect upon the formation of vortices in order to increase the heat transmission properties.

Figure 4:
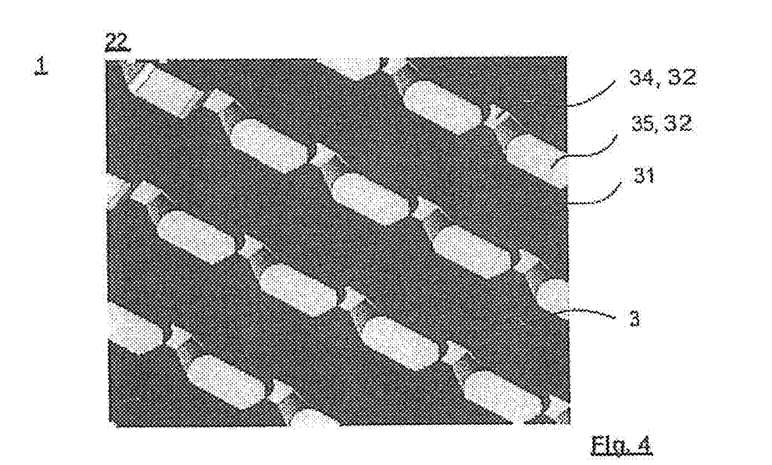
FIG. 4 shows an oblique view, emphasized by shadings, of the tube inner structure with ribs and with asymmetric frustopyramidal elevations.
Figure 5:
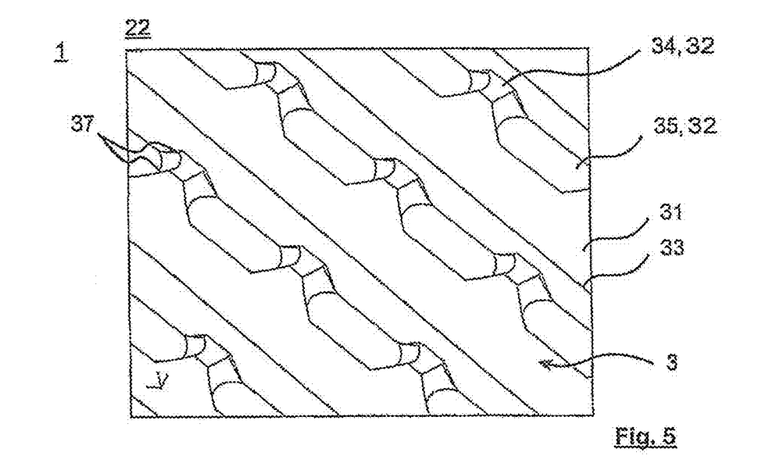
FIG. 5 shows a diagrammatic oblique view of the asymmetric tube inner structure according to FIG. 4.
Figure 6:
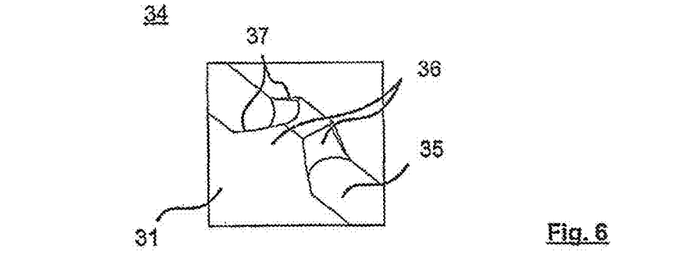
FIG. 6 shows a view, in the form of a detail, of an asymmetric frustopyramidal elevation at the rib tip.

FIGS. 4 to 6 show, again, an oblique view, emphasized by gray shadings, of the structure of the tube inside 22 of a heat exchanger tube 1 with inner ribs 3 and with frustopyramidal elevations 34. FIG. 5 shows a diagrammatic oblique view of the tube inner structure according to FIG. 4. In FIGS. 4 to 6, the frustopyramidal elevations 34 are formed asymmetrically.

In FIG. 6, once again, two flanks 36 of the frustopyramidal elevation 34 illustrated are of concave form. These flanks 36 are also part of the rib tip 32 and have a curvature which is directed into the pyramid interior and by means of which edge structures projecting markedly on the surface area of the pyramid frustum or being sharper are formed in the shape of protuberances 37 in the radial direction. As a result of the asymmetry, sharp-edged structures appropriately adapted to the flow conditions inside the tube and conducive to the formation of vortices are formed by the protuberances 37 in the radial direction.

Figure 7:
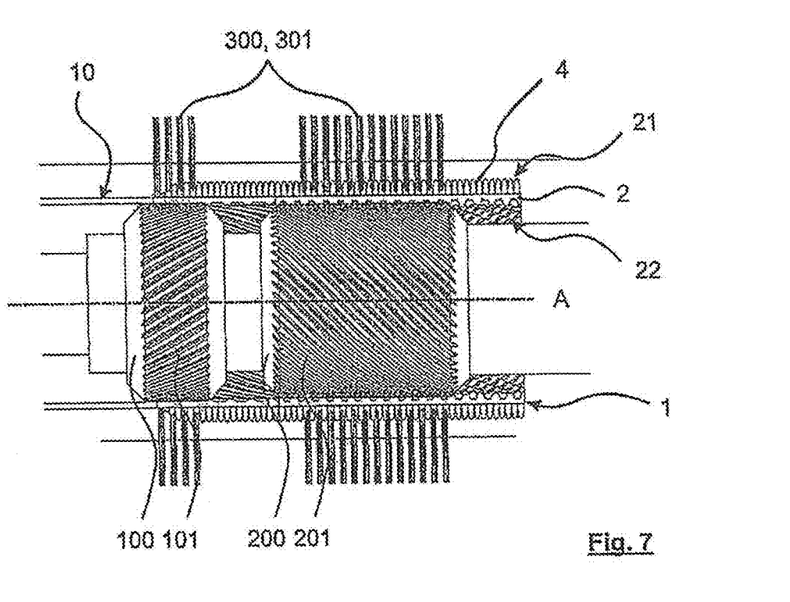
FIG. 7 shows diagrammatically a view of the device for producing an externally ribbed heat exchanger tube with inner mandrels.
Figure 8:
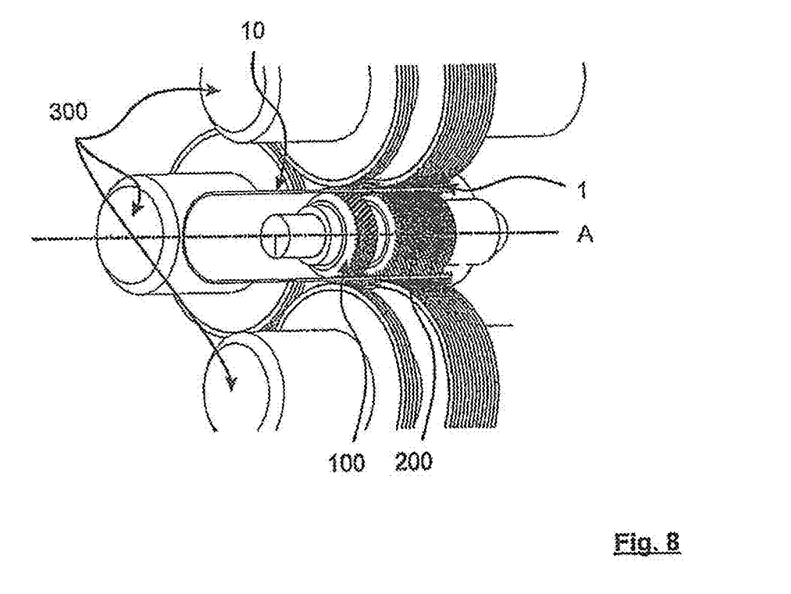
FIG. 8 shows diagrammatically an oblique view of the device for producing an externally ribbed heat exchanger tube with an outer rolling tool and with inner mandrels.

FIG. 7 shows a view of a device for producing an externally ribbed heat exchanger tube 1 with two rolling mandrels 100 and 200. FIG. 8 shows an oblique view of the device for producing an externally ribbed heat exchanger tube with an outer rolling tool and with inner mandrels, corresponding to FIG. 7. In the method for producing a heat exchanger tube 1 according to the invention, helically running outer ribs 4 are formed on the outside of a smooth tube 10 in a first forming region, in that the rib material is obtained through the displacement of material out of the tube wall 2 by means of a rolling tool 300, constructed from rolling disks 301, in a first rolling step. The ribbed tube obtained is set in rotation by the rolling forces and is pushed forward correspondingly to the helical outer ribs 4 obtained. The tube wall 2 is supported in the first forming region by a first rolling mandrel 100 which lies in the tube and which is mounted rotatably and has axially parallel or helical grooves of the first depth on its mandrel outer face 101, a relatively low pronounced inner structure being formed by material of the tube wall 2 being pressed into the grooves of the first rolling mandrel 100.

In a second rolling step, the outer ribs 4 are formed with further-rising height on the tube outside 21 in a second forming region spaced apart from the first forming region, and the tube wall 2 is supported in the second forming region by a second rolling mandrel 200 which lies in the tube and which is likewise mounted rotatably and has helical grooves of the second depth on its mandrel outer face 201, helical, continuously running inner ribs 3 being newly formed on the tube inside 22, in that material of the tube wall 2 and material of the inner structure formed in the first rolling step are pressed into the grooves of the second rolling mandrel 200. The inner ribs formed in the second forming region are markedly more pronounced than the inner structure which was formed in the first forming region. The elevations 34 on the tip of these inner ribs 3 are formed from material which was pressed into the grooves of the first rolling mandrel 100 in the first forming region.

Figure 9:
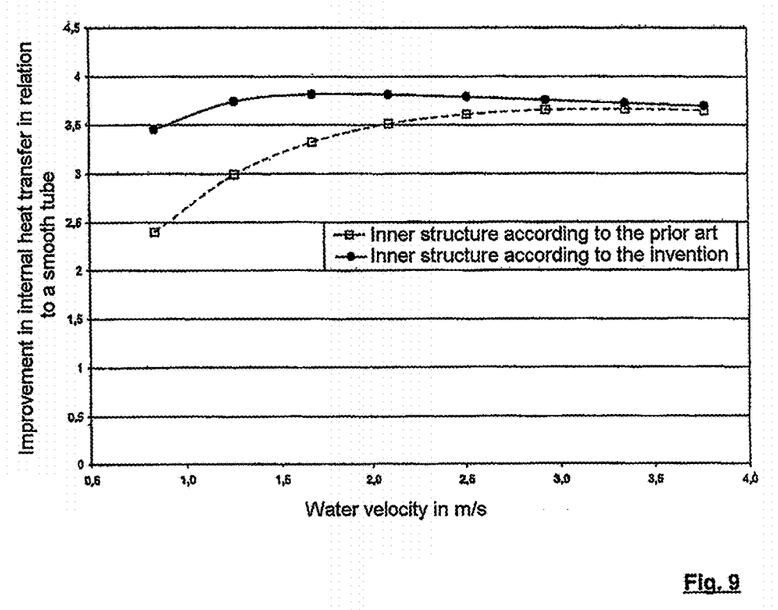
FIG. 9 shows a graph of the improvement of internal heat transition as a result of the solution according to the invention.

FIG. 9 shows a graph which documents the advantage of the inner structure according to the invention in terms of performance. Using the example of tubes with an inside diameter of 16 mm, the improvement in internal heat transfer is illustrated in relation to a smooth tube as a function of the velocity of the water flowing in the tube. The mean temperature of the water in this case amounts to 9° C. The graph illustrates both the performance behavior of a tube according to the prior art and the performance behavior of a tube having an inner structure according to the invention. Structures according to the instructions of the prior art from publication U.S. Pat. No. 5,992,513 are implemented in the reference tube. It can be seen that the inner structure according to the invention has significant increases in performance, as compared with the tube according to the prior art, for water velocities lower than 2 m/s. The advantage amounts to approximately 40% in the case of water velocities lower than 1 m/s.

LIST OF REFERENCE SYMBOLS

1 Heat exchanger tube
2 Tube wall
21 Tube outside
22 Tube inside
3 Inner ribs
31 Rib flanks
32 Rib tip
33 Groove
34 Elevations
35 Depression
36 Flanks of an elevation
37 Protuberances
4 Outer ribs
10 Smooth tube
100 First rolling mandrel
101 Mandrel outer face of the first rolling mandrel
200 Second rolling mandrel
201 Mandrel outer face of the second rolling mandrel
300 Rolling tool
301 Rolling disks
A Tube axis

What is claimed is:

1. A method for producing a heat exchanger tube, comprising the steps of:
    deforming the wall of a smooth tube (10) radially in a first forming region by a first rolling tool (300) encircling the outside of the smooth tube to form helically running outer ribs (4) of a first height on the outside of the smooth tube;
    supporting the tube wall in the first forming region with a first rolling mandrel (100) which lies inside of the tube, is mounted rotatably therein and has axially parallel or helical grooves of a depth T1 provided on its mandrel outer face and forming an inner structure on the inside of the tube wall out of material of the tube wall pressed into the grooves of the first rolling mandrel;
    forming outer ribs with an increased rising height on the outside of the tube wall in a second forming region spaced apart from the first forming region;
    supporting the tube wall in the second forming region with a second rolling mandrel (200) which lies inside with the tube, is mounted rotatably therein and has axially parallel or helical grooves of a depth T2 provided on its mandrel outer face and newly forming helical, continuously running inner ribs (3) from material of the tube wall and material of the first inner structure both being pressed into the grooves of the second rolling mandrel, wherein the inner ribs formed in the second forming region are more pronounced than the inner structure formed in the first forming region and elevations (34) on the tip of the inner ribs (3) are formed from material pressed into the grooves of the first rolling mandrel (100) in the first forming region.

2. The method according to claim 1, characterized in that, by means of the inner structure formed in the first forming region, the inner surface area of the tube having this inner structure is increased by from 4-30% with respect to the inner surface area of the non-deformed smooth tube (10).

3. The method according to claim 1, characterized in that the depth T2 of the grooves of the second rolling mandrel (200) is at least 2.5 times as great as the depth T1 of the grooves of the first rolling mandrel (100).

4. The method according to claim 1, characterized in that the flank angle of the grooves of the first rolling mandrel (100) amounts at most to 120°.

* * * * *